United States Patent [19]

Carter et al.

[11] B 4,014,676
[45] Mar. 29, 1977

[54] WATER TREATMENT FOR CONTROLLING THE GROWTH OF ALGAE EMPLOYING BIGUANIDES

[75] Inventors: Graham Carter; Anthony John Hinton, both of Manchester, England

[73] Assignee: Imperial Chemical Industries Limited, London, England

[22] Filed: Dec. 17, 1973

[21] Appl. No.: 425,285

[44] Published under the second Trial Voluntary Protest Program on April 13, 1976 as document No. B 425,285.

[30] Foreign Application Priority Data

Dec. 18, 1972 United Kingdom ............ 58289/72

[52] U.S. Cl. .................................. 71/67; 424/326
[51] Int. Cl.² .......................................... A01N 9/20
[58] Field of Search ................ 71/67, 121; 424/326

[56] References Cited

UNITED STATES PATENTS 2,336,605 12/1943 Ernsberger et al. ............... 424/326
2,643,232 6/1953 Rose et al. ...................... 424/326 X

FOREIGN PATENTS OR APPLICATIONS 254,255 3/1970 U.S.S.R. .............................. 71/67

OTHER PUBLICATIONS

Keane et al., Chem Abst. (1970), vol. 73 16630y.

Primary Examiner—Lewis Gotts
Assistant Examiner—Catherine L. Mills
Attorney, Agent, or Firm—Cushman, Darby & Cushman

[57] ABSTRACT

A method of controlling the growth of bacteria and algae in the water of swimming pools by adding to the water a specified concentration of a polymeric biguanide. Has the advantage over chlorination that at the low concentration employed the polymeric biguanide is non-toxic, non-irritant, tasteless and odorless. The anti-bacterial and anti-algal effect is also highly persistent.

3 Claims, No Drawings

WATER TREATMENT FOR CONTROLLING THE GROWTH OF ALGAE EMPLOYING BIGUANIDES

This invention relates to a method for keeping the water in swimming pools free from algal and bacterial growth.

The water in swimming pools is constantly recirculated and fresh water is normally added only to maintain the desired volume. Although the water is usually filtered continuously to keep it free from suspended matter, it is constantly exposed to infection by bacteria and algae, and treatment to control this infection is necessary for reasons of hygiene.

The main disinfectant used in swimming pools at present is chlorine, which is effective but suffers from the disadvantages that it causes eye irritation and also has to be added at frequent intervals to maintain an effective concentration.

Ozonised air has also been used as a disenfectant, but again frequent or continuous dosing is necessary, and contact with high concentrations at the point where the ozonised air is blown into the pool is unpleasant and can cause headaches.

It has now been found that growth of bacteria and algae in swimming pools can be controlled for long periods by addition of certain biguanide compounds.

According to the present invention there is provided a method for controlling the growth of bacteria and algae in the water of swimming pools which comprises adding to the water, in an amount to provide a concentration of from 1 to 200 parts per million, a linear polymeric biguanide or a salt thereof which in its free base form has a recurring polymer unit represented by the formula

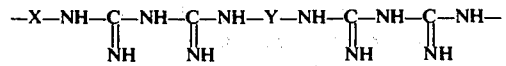

wherein X and Y represent bridgind groups in which together the total number of carbon atoms directly interposed between the pairs of nitrogen atoms linked by X and Y is more than 9 and less than 17.

The bridging groups X and Y may consist of polymethylene chains, optionally interrupted by hetero atoms, for example, oxygen, sulphur or nitrogen. X and Y may also incorporate cyclic nuclei which may be saturated or unsaturated, in which case the number of carbon atoms directly interposed between the pairs of notrogen atoms linked by X and Y is taken as including that segment of the cyclic group, or groups, which is the shortest. Thus, the number of carbon atoms directly interposed between the nitrogen atoms in the group

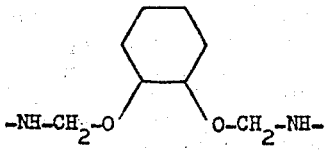

is 4 and not 8.

The preferred polymeric biguanide for use in the present invention is poly(hexamethylene biguanide), in which X and Y both represent the $-(CH_2)_6-$ group. The compound is preferably employed in the form of its hydrochloride salt, which is conveniently used as a 20% w/w aqueous solution (i.e. 100 parts by weight of the solution contain 20 parts by weight of the active agent).

Polymeric biguanides may be prepared by the reaction of a bisdicyandiamide having the formula

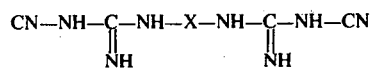

with a diamine $H_2N-Y-NH_2$, wherein X and Y have the meanings defined above;

or by reaction between a diamine salt of dicyanimide having the formula

with a diamine $H_2N-Y-NH_2$ wherein X and Y have the meanings defined above. These methods of preparation are described in UK Specifications Nos. 702,268 and 1152243 respectively, and any of the polymeric biguanides described therein may be used according to the present invention.

The polymer chains are terminated either by an amino hydrochloride group or by an

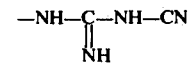

group, and the terminating groups may be the same or different on each polymer chain.

A small proportion of a primary amine $R-NH_2$, where R represents an alkyl group containing from 1 to 18 carbon atoms, may be included with the diamine $H_2N-Y-NH_2$ in the preparation of polymeric biguanides as described above. The primary monoamine acts as a chain-terminating agent and consequently one or both ends of the polymeric biguanide polymer chains may be terminated by an $-NHR$ group. The use of these chain-stopped polymeric biguanides is also within the scope of the present invention.

It is to be understood that by either of the above-described methods the polymeric biguanides are obtained as mixtures of polymers in which the polymer chains are of different lengths, the number of individual biguanide units, i.e.

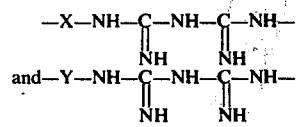

together being from 3 to about 80.

In the case of the preferred poly(hexamethylene biguanide) having the formula

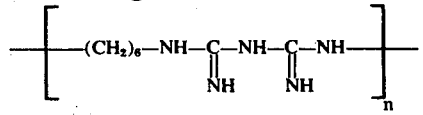

the value of n is in the range from 6 to 10, the average molecular weight of the polymer mixture being from about 1100 to about 1800.

Polymeric biguanides are known to possess powerful antibacterial properties and to inhibit the growth of fungi. However, they have not previously been shown to be effective in preventing the growth of algae in water. Surprisingly it has been found that a single treatment of the water in a swimming pool with the polymeric biguanide to provide a concentration in the range defined above, can be effective in controlling the growth of bacteria and algae for a whole season of up to nine months or even longer.

Under normal circumstances, a concentration of about 10 to 12 parts per million of the polymeric biguanide or salt thereof is found to be effective, but it will be understood that how long an effective concentration is maintained will depend upon the number of persons using the swimming pool. Over a period of several months a heavily used pool may require a second or even a third dosing with the polymeric biguanide to maintain the concentration at the effective level defined above. The concentration should preferably not be less than about 4 parts per million.

Since long-term control of bacterial and algal growth in the water of swimming pools is readily achieved according to the present invention, the necessity for providing expensive equipment for constantly metering controlled amounts of chlorine into the water is avoided. It is only necessary to dissolve the polymeric biguanide in the water and to ensure a uniform concentration in the range difined. Furthermore, at the very low concentrations found to be effective, the polymeric biguanides have no irritant effect on the eyes and no objectionable odour or taste.

The invention is illustrated but not limited by the following Examples, in which parts and percentages are by weight unless otherwise stated.

EXAMPLE 1

An outdoor swimming pool having a surface area of 50 m² and a capacity of 13,500 gallons was treated with poly(hexamethylene biguanide) hydrochloride in the form of a 20% w/w aqueous solution to provide a concentration in the water of 10 p.p.m. of the active ingredient. A trial was then carried out during 12 months from September to the following September. Observations to detect algae growth and determinations of certain pathogenic bacteria were made from May to September, during which time the pool was used by 237 persons. The water temperature varied from 21° to 27°C. By mid-June the level of polymeric biguanide in the water had fallen to 2 p.p.m. and a second dose of 8 p.p.m. was added to bring the concentration up to the original level of 10 p.p.m.

During the course of the trial no algae growth was observed and no coliform bacteria (including *E. Coli*) or staphylococci (including *Staph. aureus*) were detected in 100 ml. volumes of water which were sampled at weekly intervals.

The above indicated that a concentration of 10 p.p.m. of poly(hexamethylene biguanide) hydrochloride satisfactorily controlled the proliferation of algae and certain bacterial pathogens over the trial period.

EXAMPLE 2

An indoor swimming pool having a surface area of 50 m² and a capacity of 15,000 gallons was treated with poly(hexamethylene biguanide) hydrochloride in the form of a 20% w/w aqueous solution to provide a concentration in water of 10 ppm of the active ingredient. A trial was conducted in a three-month period from May to August, during which time the water temperature varied from 17° to 28°C and the pool was used by 420 persons. During the course of the trial no algal growth was observed and no coliform bacteria (including E. coli) or staphylococci (including Staph. aureus) were detected.

Laboratory testing of anti-bacterial and anti-algal activity i. Laboratory comparison of the anti-algal activity of poly(hexamethylene biguanide) hydrochloride with other biocides.

An inoculum was prepared which consisted of a mixed culture of algae from a cooling tower slime in an inorganic salts medium having the following composition (grams/liter): ammonium nitrate, 3; dipotassium hydrogen phosphate, 1; potassium chloride, 0.25.

Poly(hexamethylene biguanide) hydrochloride was compared with a quaternary ammonium biocide (lauryldimethylbenzyl ammonium chloride), with 1,2-benzisothiazolin-3-one and with methylene bisthiocyanate. The above-mentioned biocides were added to 100 ml. of inorganic salts medium in Petri dishes to give the following concentrations (as active ingredient) : 1, 5, 10, 50 and 100 p.p.m. 1 ml. of the algal inoculum was added to each of the Petri dishes and the latter were incubated at room temperature (approximately 20°C) for two weeks under constant artificial illumination. The Petri dishes were then examined for algal growth, after which each variant received a second algal inoculum before being incubated for a further four-week period. The presence or absence of algal growth was finally recorded, as follows:

| Biocide | Minimum inhibitory concentration (p.p.m. of active ingredient) after: | |
|---|---|---|
| | 2 weeks | 6 weeks |
| Poly(hexamethylene biguanide)hydrochloride | 1 | 5 |
| Quaternary ammonium biocide | 1 | 5 |
| 1,2-Benzisothiazolin-3-one | 50 | 100 |
| Methylene bisthiocyanate | 50 | 100 |

Poly(hexamethylene biguanide) hydrochloride and the quaternary ammonium biocide are therefore approximately equivalent and very much more effective in suppressing algal growth than the remaining two biocides. However, the quaternary ammonium biocide is not suitable for use in swimming pools because it is highly surfaceactive and causes foaming.

ii. A polymeric biguanide was prepared by the reaction of the hexamethylene diamine salt of dicyanimide with 4,4'-diaminodicyclohexylmethane hydrochloride by the general method described in United Kingdom Patent Specification No. 1152243.

This material was tested for its antibacterial activity in the laboratory by the following method:

A 1 suspension of an overnight culture of *E.coli* was transferred into a 10 ml. portion of the biocide solution. After a contact time of 3 minutes 1 ml. of the solution was transferred into 10 ml. of 'Antrypol' solution-'Antrypol' has the structure:

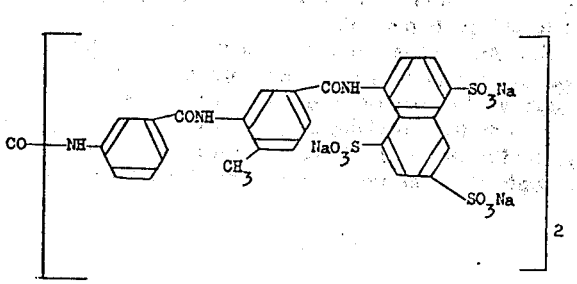

whereby the biocide is neutralised. The surviving bacterial cells are then determined by the dolution count method.

The following results were obtained, the experiment being carried out in duplicate (poly(hexamethylene biguanide) hydrochloride was also tested for comparison).

|  | Survivors (cells/ml.) after 3 minutes contact time | |
|---|---|---|
|  | 1 | 2 |
| Poly(hexamethylene biguanide) hydrochloride, 200 p.p.m. | $2.2 \times 10^3$ | $2.0 \times 10^3$ |
| Poly(hexamethylene/dicyclohexylmethane biguanide) hydrochloride, 200 p.p.m. | <10 | <10 |
| Control (no biocide) | $4.3 \times 10^8$ | $3.7 \times 10^8$ |

Thus, it can be seen from the above that the poly(hexamethylene/dicyclohexylmethane biguanide) hydrochloride is even more effective than poly(hexamethylene biguanide) hydrochloride as a bactericide. The compound is also an effective inhibitor of algal growth. The initial count of $>10^8$ cells/ml. in this test is, of course, far higher than any conceivable concentration in swimming pool water, where 500 or more cells/ml. would be regarded as an undesirable level of contamination; and the reduction of the bacterial count by a factor of $10^5$ in the case of poly(hexamethylene biguanide) hydrochloride and an almost total kill in the case of the poly(hexamethylene/dicyclohexylmethane biguanide) hydrochloride concentrations of 200 ppm in only 3 minutes illustrates how effective these compounds are as bactericides. iii) A hexadecyl-terminated poly(hexamethylene biguanide hydrochloride) was prepared by the reaction of the hexamethylene salt of dicyanimide with a mixture of hexamethylene diamine hydrochloride and hexadecylamine hydrochloride by the general method described in United Kingdom Patent Specification No. 1152243. The hexamethylene diamine hydrochloride and hexadecylamine hydrochloride were used in the molar ratio 90:10 respectively.

This alkyl-terminated material was tested for its antibacterial activity in the laboratory by the method described in (iii) above.

The following results were obtained, again using poly(hexamethylene biguanide) hydrochloride as comparison:

| Treatment | | Surviving cells after 3 minutes contact time (Cells/ml.) |
|---|---|---|
| Hexadecyl-terminated poly(hexamethylene biguanide) hydrochloride | 200 ppm | $10^4$ |
|  | 100 ppm | $10^5$ |
|  | 50 ppm | $10^5$ |
| Poly(hexamethylene biguanide) hydrochloride | 200 ppm | $10^1$ |
|  | 100 ppm | $10^3$ |
|  | 50 ppm | $10^3$ |
| Control (no biocide) | — | $10^8$ |

The hexadecyl material is seen to be somewhat less effective as a bactericide than poly(hexamethylene biguanide) hydrochloride itself, but the performance of both materials is very satisfactory in terms of the reduction in the numbers of cells surviving after only 3 minutes contact with the original massive concentration of E.coli bacteria.

The hexadecyl-terminated material was also tested for anti-algal activity by the following method:

A suspension of a mixed culture of algae isolated from an industrial cooling tower was transferred into solutions of the test biocides in distilled water at concentrations of 10, 25, 50 and 100 ppm for a contact period of 7 days. At the conclusion of this time the solutions containing the algae were filtered through a millipore membrane. The membrane with the entrapped algae was transferred to an algal growth medium (mineral salts and soil extract) and incubated under artificial light for 7 days. The membrane was then examined for the presence or absence of the development of a green colouration. A green colour indicates that the biocide did not kill the algal inoculum at the concentration employed, whereas no colour indicates that the biocide did kill the algal inoculum.

The results obtained are as follows:-

| Treatment | | Growth of Algae on membrane filters |
|---|---|---|
| Poly(hexamethylene biguanide) hydrochloride | 100 ppm | — |
|  | 50 ppm | — |
|  | 25 ppm | — |
|  | 10 ppm | + |
| Hexadecyl-terminated poly(hexamethylene biguanide) hydrochloride | 100 ppm | — |
|  | 50 ppm | — |
|  | 25 ppm | — |
|  | 10 ppm | + |
| Control (no biocide) |  | +++ |

Key
− = no growth, + = slight growth, +++ = heavy growth

The two polymeric biguanides are seen to be about equally effective in their algicidal properties.

The conditions prevailing in this test are far more severe than would be met with in the water of a swimming pool because of the massive initial concentration of algae. A far lower concentration (i.e. 4 to 12 ppm) of a polymeric biguanide is effective under actual swimming pool conditions for the control of algae.

iv) A further laboratory test showed that a concentration of 10 parts per million poly(hexamethylene biguanide) hydrochloride an initial count of $10^5$ bacterial cell per ml. (*E.coli* or *Staph. faecalis*) was reduced to nil after 30 seconds contact time. This bacterial concentration is much higher than would be found in swimming pool water.

What we claim is:

1. A method for controlling the growth of algae in the water of swimming pools which comprises adding to the water poly(hexamethylene biguanide) hydrochloride, in an amount to provide a concentration of from 1 to 200 parts per million.

2. A method as claimed in claim 1 wherein the average molecular weight of the poly(hexamethylene biguanide) hydrochloride is from 1100 to 1800.

3. A method as claimed in claim 1 wherein the polymeric biguanide or salt thereof is used in an amount to provide a concentration from 4 to 12 parts per million.

* * * * *